(12) United States Patent
Fourte et al.

(10) Patent No.: US 7,224,515 B2
(45) Date of Patent: May 29, 2007

(54) OPTICAL AMPLIFIERS

(75) Inventors: Stephen David Fourte, Devon (GB);
Ian Peter McClean, Devon (GB);
Gregory Dean May, Devon (GB);
Hazel Ann McInnes, Scotland (GB);
Olivier Nicolas Moteau, Cambridge (GB)

(73) Assignee: Bookham Technology plc, Northamptonshire (GB)

( * ) Notice: Subject to any disclaimer, the term of this patent is extended or adjusted under 35 U.S.C. 154(b) by 0 days.

(21) Appl. No.: 11/142,549

(22) Filed: Jun. 1, 2005

(65) Prior Publication Data
US 2005/0248833 A1 Nov. 10, 2005

(30) Foreign Application Priority Data
Nov. 25, 2004 (GB) .................................. 0425907.3

(51) Int. Cl.
*H01S 3/00* (2006.01)
(52) U.S. Cl. .................................................. 359/337.1
(58) Field of Classification Search ............. 359/337.1
See application file for complete search history.

(56) References Cited

U.S. PATENT DOCUMENTS

| | | | |
|---|---|---|---|
| 6,535,330 B1 | 3/2003 | Lelic et al. | |
| 6,687,045 B2* | 2/2004 | Lelic | ........................ 359/337.1 |
| 6,856,454 B2* | 2/2005 | Pavel et al. | ................... 359/337 |
| 2002/0071173 A1* | 6/2002 | Lee et al. | ................. 359/337.1 |
| 2002/0141044 A1 | 10/2002 | Sugawara et al. | |
| 2003/0048525 A1 | 3/2003 | Irie | |
| 2004/0051938 A1* | 3/2004 | Chan et al. | .............. 359/337.1 |
| 2004/0075888 A1 | 4/2004 | Eselt | |

OTHER PUBLICATIONS

UK Search Report for corresponding Application No. 0425907.3 dated Feb. 16, 2005.

* cited by examiner

*Primary Examiner*—Deandra M. Hughes
(74) *Attorney, Agent, or Firm*—Renner, Otto, Boisselle & Sklar, LLP

(57) ABSTRACT

A multichannel optical amplifier having an adjustable gain set point is controlled to permit substantially constant gain tilt control during a gain set-point change so that the channel powers are maintained during system modification. To this end the amplifier comprises an erbium doped fibre (EDF) loop and associated pump amplifier for amplifying an optical signal comprising channels of different wavelengths, a variable optical attenuator (VOA) for controlling the gain of the amplifier by applying a loss profile that varies with wavelength so that the different channels are amplified in accordance with a required gain tilt, preferably a zero gain tilt, and a PI controller for applying a gain tilt adaptation profile to compensate for an inherent gain tilt to produce the required gain tilt. Furthermore the PI controller is arranged to change the gain tilt adaptation profile in response to a change in the gain set point to allow for the different gain characteristics of the amplifier at different gain set points.

20 Claims, 8 Drawing Sheets

OPTICAL AMPLIFIERS

BACKGROUND OF THE INVENTION

This invention relates to optical amplifiers and is concerned more particularly, but not exclusively, with erbium doped fibre amplifiers (EDFAs).

Optical amplifiers designed to amplify multichannel optical signals ideally maintain gain tilt substantially constant as the gain level, that is the set point, is varied. This should be done by careful control of gain and loss within the amplifier so that, at each gain set point, a substantially constant gain tilt is applied across the range of wavelengths to be amplified. Preferably the gain tilt is compensated so that the gain is substantially constant across the full range of wavelengths to be amplified. In the case of an erbium doped fibre amplifier (EDFA) the gain is controlled by the drive current applied to the or each optical pump laser for supplying pump light to the erbium doped fibre (EDF) loop, and a compensating loss may be provided by a variable optical attenuator (VOA) so as to control the gain such that a substantially constant gain is applied across the full range of wavelengths for a particular gain set point. A pump laser having a linear drive response and control can be provided by analogue or digital techniques. However, VOAs have variable characteristics with the result that it can be difficult to ensure that the gain tilt applied to the multichannel signal remains substantially constant at different levels of amplification.

In this specification the term "gain tilt" encompasses within its scope both the case where the "gain tilt" is zero, corresponding to all the channels being amplified by the same amount, and the case where the "gain tilt" is non-zero.

FIG. 1 is a graph illustrating a change in the gain of such an amplifier with respect to time, the arrows showing diagrammatically the ideal case in which, at each gain level, the different channels are amplified by the same amount (zero gain tilt) whether the amplification is at its initial low level, an intermediate level or its final high level.

However, FIG. 2 shows a typical VOA drive characteristic from which it will be appreciated that not only does the VOA loss vary non-linearly with the applied voltage, but also a different voltage change is required for the same loss change, for example 3 dB, depending upon the magnitude of the loss as shown by A (low VOA loss, high amplifier gain) and B (high VOA loss, low amplifier gain) in FIG. 2, where clearly the voltage change at A is much greater than at B even though they both correspond to the same loss change.

Typically a digital control circuit employing a simple proportional-integral (PI) loop is used to control the VOA loss to render the gain for the different wavelength channels substantially the same across all channels. However such a circuit is unable to control the loss in the required manner at both points A and B. Instead the provision of a high gain factor in the PI loop will mean that there is an overshoot of the required VOA loss at high voltage and instability at low VOA loss. A low gain factor in the PI loop will mean that the VOA loss is not achieved in the required time frame and the loss lags the amplifier gain at low VOA drive.

Since the gain of the amplifier and the VOA attenuation must be changed simultaneously in order to control the tilt, the VOA attenuation cannot be changed quickly enough in the case of there being a low gain factor in the PI loop, and accordingly the VOA attenuation falls behind the value (or target) required. This results in the output spectrum being tilted until such time as the VOA attenuation catches up the amplifier gain. This lag is shown diagrammatically in FIG. 3 for a VOA control arrangement utilising a low gain factor in the PI loop showing the variation 1 in the attenuation with respect to time, being a stepwise variation with a cycle time of 16 ms and a target step of 0.1 dB, adjacent to the gain variation 3 with respect to time of the amplifier. In this case the 16 ms cycle of the VOA step voltage results in the VOA target being met at high VOA losses, as shown at 2, whereas, as the VOA step voltage increases, the target is increasingly not met, resulting in a lag between the target step time and the VOA arrival time, as shown at 4. This time lag at low VOA losses results in the gain tilt not being maintained so that some channels are subjected to greater gain than is necessary. This is shown in the graph of FIG. 4 corresponding to that of FIG. 1 but showing, by means of the different sized arrows, that, during a set point change, some of the channels are subjected to a greater gain than other channels at an intermediate gain level (non-zero gain tilt), whereas the different channels are amplified by the same amount (zero gain tilt) when the amplification is at its initial low level or its final high level, so that the gain tilt varies as the gain set point is changed. Measurement of the channel gain at this intermediate gain level clearly shows an overshoot in the gain of the blue-end channels.

FIG. 5 shows the change in the log optical power with respect to time of the 1530 nm and 1556 nm channels of such an amplifier during such a gain set point change from a low gain to a high gain. It will be seen in this figure that, during the rising section of the plot, the ramp rate is fairly similar for the two channels for the majority of the time, but that an overshoot can be observed in the 1530 nm channel due to the lag in the VOA loss reaching its target. This can be seen more clearly in the enlarged view of FIG. 6 showing that the tilt control begins to fail at high gains when the voltage change for the same VOA loss is less. In this case both channels reach the top of the ramp at the same time indicating synchronised digital signal processing (DSP) and VOA.

FIG. 7 shows the corresponding case for a gain set point change from a high gain to a low gain, with the initial part of the transition corresponding to a relatively low VOA loss resulting in dispersion of the channels as a result of the VOA loss not reaching its correct value. At higher VOA loss values, the VOA loss is able to catch up to the required set point and accordingly the dispersion between the channels is less.

SUMMARY OF THE INVENTION

It is an object of the invention to provide an optical amplifier that permits substantially constant gain tilt control during a gain set-point change so that the channel powers are maintained during system modification.

According to the present invention there is provided an optical amplifier having an adjustable gain set point, comprising:

(i) amplifying means for amplifying an optical signal comprising channels of different wavelengths, (ii) gain control means for controlling the gain of the amplifying means so as to amplify the different channels in accordance with a required gain tilt, and (iii) gain tilt adjustment means for applying a gain tilt adaptation profile to the gain control means to compensate for an inherent gain tilt of the amplifying means to produce the required gain tilt, and for changing the gain tilt adaptation profile in response to a change in the gain set point from a first gain setting to a second gain setting to maintain the required gain tilt during the period in which the gain is being changed between the first gain setting and the second gain setting.

Such an arrangement is adapted to provide substantially constant gain tilt control during a gain set-point change so that the channel powers are maintained during system modification and system degradation is reduced during unmanaged provisioning. Typically the gain is controlled so as to amplify the different channels in accordance with zero gain tilt corresponding to all the channels being amplified by substantially the same amount. However it is also contemplated within the scope of the invention that the gain may be controlled so as to amplify the different channels in accordance with a non-zero gain tilt in which the different channels are amplified by different amounts with the gain tilt remaining the same as the gain is changed.

Preferably the gain control means means includes variable attenuation means for varying the level of amplification of the amplifying means. Such variable attenuation means will generally be a variable optical attenuator (VOA) having a non-linear gain characteristic.

Furthermore the gain control means is preferably arranged to control the level of attenuation applied by the variable attenuation means in accordance with a required loss profile so as to ensure that the different channels are amplified in accordance with the required gain tilt. The loss profile is set to apply the required gain tilt to compensate for the wavelength dependence of the amplifying means, e.g. the EDF.

The gain tilt adjustment means may then be arranged to change the gain tilt adaptation profile in response to a change in the gain set point by changing the loss profile applied by the variable attenuation means. The application of different loss profiles to suit different gain set points serves to overcome the disadvantageous effects of gain overshoot and instability referred to above.

In one embodiment of the invention the gain control means includes input detection means for detecting an optical input signal to the amplifying means. In this case the gain control means may also include output detection means for detecting an optical output signal from the amplifying means. The or each detection means may incorporate a tap-off coupler for tapping off a proportion of the optical signal. Furthermore the or each detection means may incorporate a photodetector for supplying an electrical detection signal indicative of a detected optical signal.

In a preferred implementation the gain tilt adjustment means incorporates feedback setting means for comparing a current attenuation value related to the gain set point fed back by the gain control means to a required attenuation value and for changing the applied attenuation value in response to a difference between the current attenuation value and the required attenuation value.

In this case the gain tilt adjustment means advantageously incorporates a proportional and integral (PI) controller for controlling the gain of the amplifying means at the required gain set point in accordance with a PI coefficient corresponding to the required gain til. The gain tilt adjustment means may then incorporate a PI coefficient control means for changing the PI coefficient applied by the PI controller in response to a change in the gain set point to compensate for different gain characteristics of the amplifying means at different gain set points. Furthermore the PI coefficient control means may incorporate threshold means for comparing a current attenuation value related to the gain set point to a predetermined threshold value and for selecting the appropriate PI coefficient in dependence on the result of this comparison. Such an adaptive PI control arrangement enables the control loop to be modified in dependence on the gain condition that the amplifier is in, and permits the use of non-linear attenuator losses to provide logarithmic power changes whilst maintaining the set gain tilt.

Typically the amplifying means will include at least one erbium-doped fibre loop and at least one pump laser diode, although the invention can also be applied to other forms of optical amplifier.

The invention also provides a method of controlling an optical amplifier having an adjustable gain set point, the method comprising:

(i) amplifying an optical signal comprising channels of different wavelengths, (ii) controlling the gain of the amplifying means so as to amplify the different channels in accordance with a required gain tilt, and (iii) applying a gain tilt adaptation profile to compensate for an inherent gain tilt to produce the required gain tilt, and changing the gain tilt adaptation profile in response to a change in the gain set point from a first gain setting to a second gain setting to maintain the required gain tilt during the period in which the gain is being changed between the first gain setting and the second gain setting.

BRIEF DESCRIPTION OF THE DRAWINGS

In order that the invention may be more fully understood, reference will now be made, by way of example, to the accompanying drawings, in which.

In order that the invention may be more fully understood, a preferred embodiment of optical amplifier in accordance with the invention will now be described, by way of example, with reference to the accompanying drawings, in which.

DETAILED DESCRIPTION OF THE DRAWINGS

Figure 16:
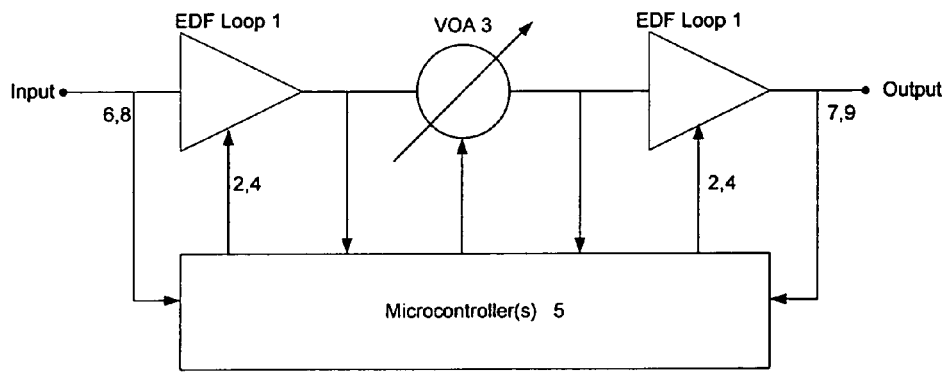
FIG. 16 is an overall diagram of the preferred embodiment.

The preferred embodiment of the invention to be described below is applied to an erbium-doped fibre (EDF) loop amplifier, as diagrammatically illustrated in FIG. 16, comprising one or more EDF loops 1 and a VOA 3 for setting the overall gain and gain tilt of the amplifier. The EDF loops 1 are supplied with pump light from pump laser diodes 4 by way of optical couplers 2 under the control of an electronic control circuit 5. If required more than one laser diode may be provided for pumping the or each EDF loop, and/or additional loops and associated pump laser diodes may be provided. Generally the pump stages are controlled in response to receipt by the control circuit 5 of electrical detection signals from photodiodes 6 and 7 and associated tap-off couplers 8 and 9 for monitoring the input and output signals of the amplifier.

The attenuation of the VOA 3 is controlled by an electronic control signal from the control circuit 5 as a function of the required gain of the amplifier and any correction required to provide the required gain tilt, for example a zero gain tilt so that all the channels of the optical input signal are amplified by substantially the same amount. The control circuit 5 is designed to control the VOA 3 so as to provide a constant gain tilt during a gain set-point change so that channel powers are maintained during system modification.

Figure 12:
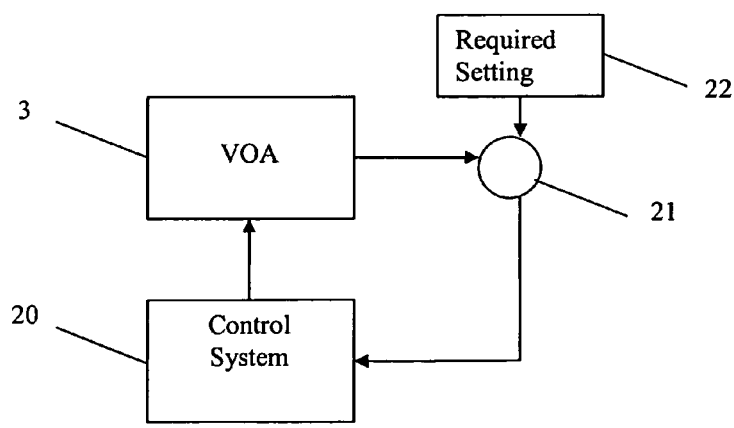
FIG. 12 is a diagram of the control scheme used in the preferred embodiment.

The control circuit 5 uses an adaptive PI control system, as shown diagrammatically in FIG. 12, that modifies the control loop in dependence on the gain condition that the amplifier is in. In this case the control system 20 is connected in a closed loop with the VOA 3 and a comparator 21, with the control system 20 being set to minimise the difference between the required setting of the VOA 3 as indicated at 22 and the actual setting of the VOA 3. Such a control scheme allows the use of a non-linear VOA loss to provide logarithmic power changes whilst maintaining set gain tilt.

Figure 13:
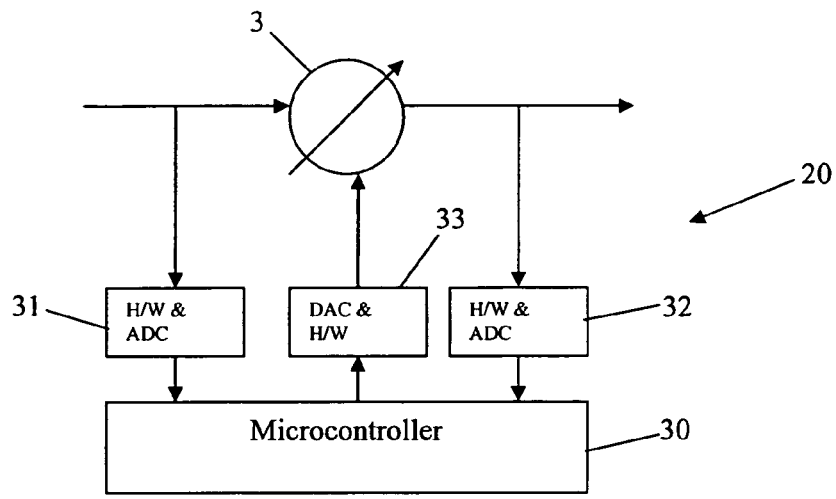
FIG. 13 is a diagram of the control system associated with the VOA of the preferred embodiment.

The preferred implementation of the VOA control system 20 is shown diagrammatically in FIG. 13. It will be seen from this figure that the control system 20 comprises a microcontroller 30 which monitors the input and output of the VOA 3 by means of signal conditioning hardware and analogue to digital converters (ADC) 31 and 32, typically by means of tap-off couplers and photodiodes for providing electrical detection signals proportional to the optical input and output signals. The microcontroller 30 sends a control signal by way of signal conditioning hardware and a digital to analogue converter (DAC) 33 to the VOA 3 to set the attenuation of the VOA 3. It will be appreciated from the graph of FIG. 2 that the relationship between the control signal applied to the VOA and the corresponding VOA attenuation (in dB) is not linear, that is that the voltage required to provide a particular level of VOA loss will vary depending on the magnitude of the loss.

In a standard control system, the coefficient of the control loop would be set to a fixed value determined either by the design or empirically and would not be changed during a gain set point change. Because of the non-linear response of the VOA dependent on the gain setting required, the response of the control loop would accordingly vary depending on the time that it took to reach its target value.

Figure 14:
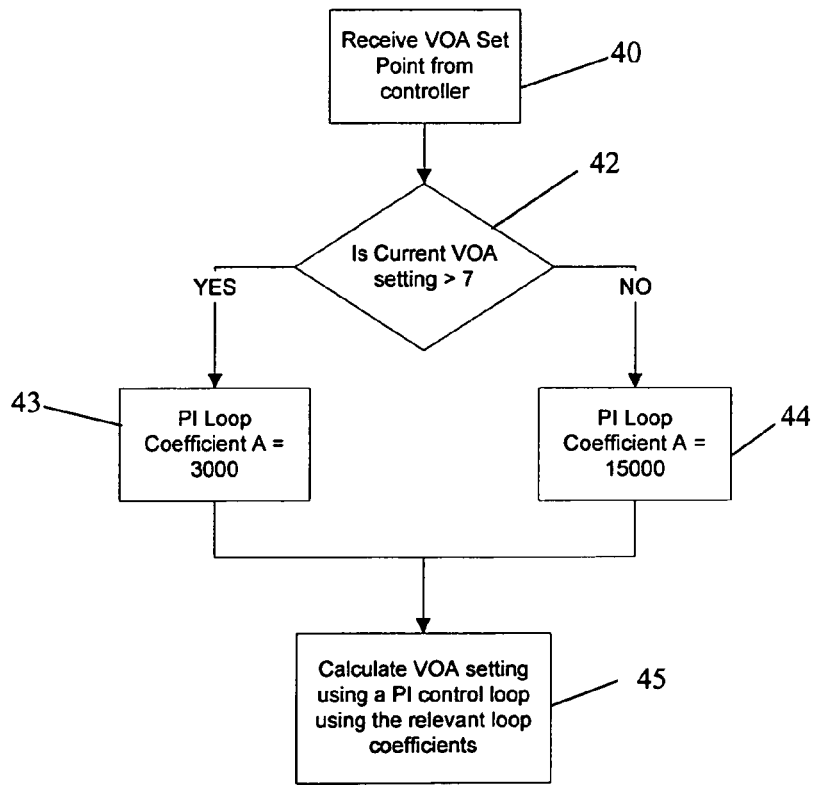
FIG. 14 is a flow diagram showing the adjustment of the PI coefficient during a gain set point change in use of the preferred embodiment.

The preferred embodiment of the invention overcomes this problem by changing the coefficients of the control loop depending on the current setting of the VOA. This enables the required response time to be achieved regardless of the gain setting required. FIG. 14 diagrammatically illustrates a control algorithm for detecting when the required gain set point is in a particular area, for example in the area around A in FIG. 2, and for increasing the PI coefficient so that the control loop changes the voltage by a large amount on each iteration of the loop. On the other hand, when the control system detects that the required gain point is nearer to point B in FIG. 2, it reduces the PI coefficient so that the control loop changes the voltage by a smaller amount on each iteration of the loop, in order to maintain the stability of the loop. Referring to the flow diagram of FIG. 14, the current VOA set point from the controller is supplied at 40 to a comparator 41 in which it is determined whether the current VOA set point is greater than 7. In the event that the current VOA set point is greater than 7, a PI loop coefficient A of 3000 is selected at 43. In the event that the current VOA set point is not greater than 7, a PI loop coefficient A of 15000 is selected at 44. The appropriate selected PI loop coefficient is supplied from 43 or 44 to 45 to calculate the required VOA setting by means of the PI control loop using the appropriate loop coefficient. It is not possible to use high PI coefficients at all times because a small change in the measured VOA loss can result in a large change in the control voltage and this may cause the loop to oscillate. The PI control loop uses proportional (P) and integral (I) feedback in order to set the VOA loss.

The output of the PI control loop=$Kp$*Error+$Ki$*(Integral of the Error)

where $Kp$ is the proportional gain, $Ki$ is the integral gain and these two values are changed depending on the current VOA setting to provide the required adaptive PI control.

This formula is implemented inside the microcontroller using the following calculation:

New Drive Value=Previous Drive Value+(Error*Loop Coefficient $A$)−(Previous Error*Loop Coefficient $B$)

where Loop Coefficient A and Loop Coefficient B are derived from $Kp$ and $Ki$.

Figure 15:
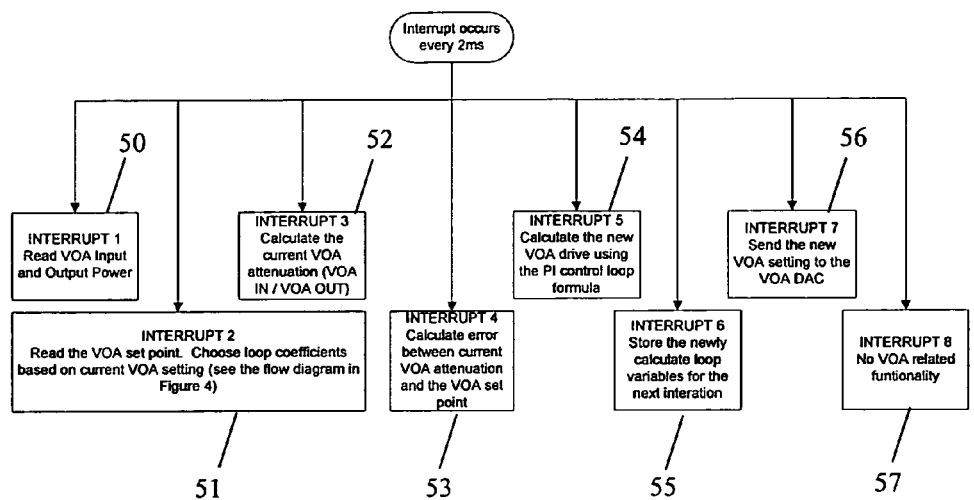
FIG. 15. shows the funtionality of the microcontroller of a preferred embodiment.

FIG. 15 illustrates the functionality of the microcontroller 30 in which an interrupt is called for every 2 ms and executes various functions in the following eight states:

Interrupt 1 at 50—read VOA input and output power

Interrupt 2 at 51—read the VOA set point, and choose loop coefficients based on current VOA setting Interrupt 3 at 52—calculate the current VOA attenuation (VOA IN/VOA OUT)

Interrupt 4 at 53—calculate error between current VOA attenuation and the VOA set point Interrupt 5 at 54—calculate the new VOA drive using the PI control loop formula Interrupt 6 at 55—store the newly calculated loop variables for the next iteration Interrupt 7 at 56—send the new VOA setting to the VOA DAC Interrupt 8 at 57—no VOA related functionality.

After execution of all eight states, the state machine returns to the first state and calls interrupt 1 again on the next interrupt.

The above described control scheme enables different gain factors to be used at different points in the VOA drive curve, so that a high gain loop is used at high VOA loss and a low gain loop is used at low VOA loss. This allows the VOA to meet its target value over the whole set-point range.

Figure 1:
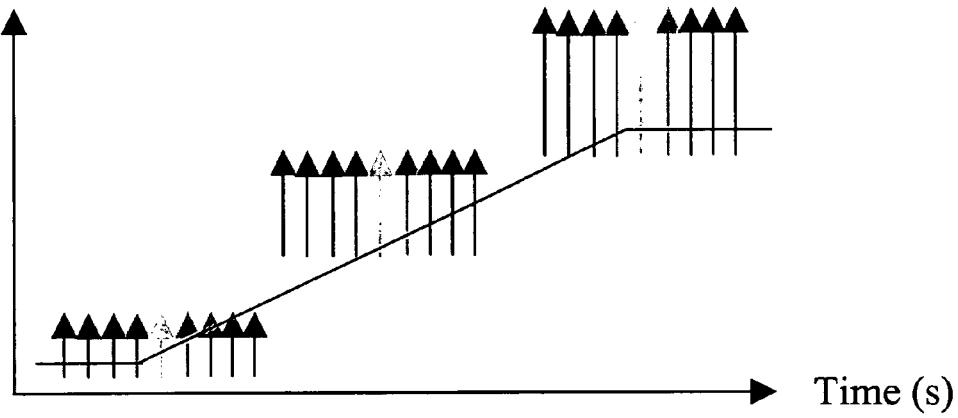
FIG. 1 is a graph illustrating a change in gain of an ideal multichannel optical amplifier.
Figure 2:
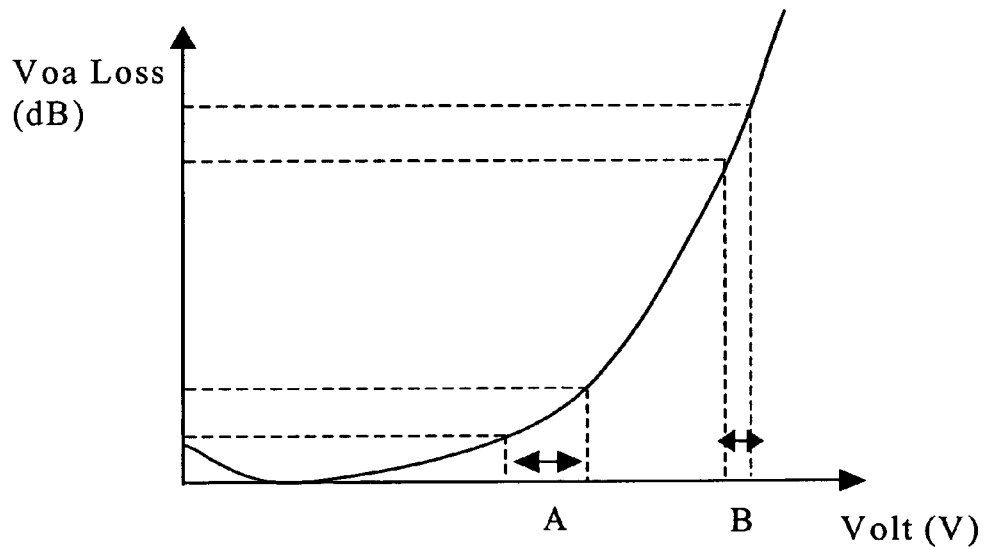
FIG. 2 is a graph showing a typical VOA drive characteristic.
Figure 3:
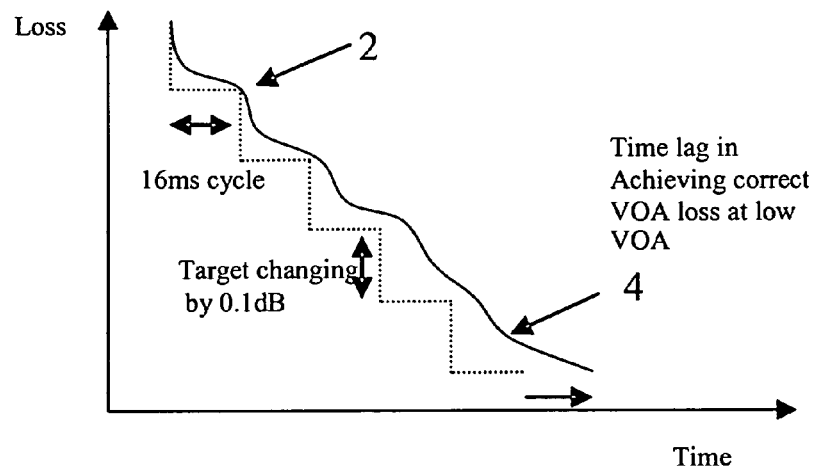
FIG. 3 is a graph showing a typical loss characteristic obtained using a known PI loop VOA control arrangement.
Figure 4:
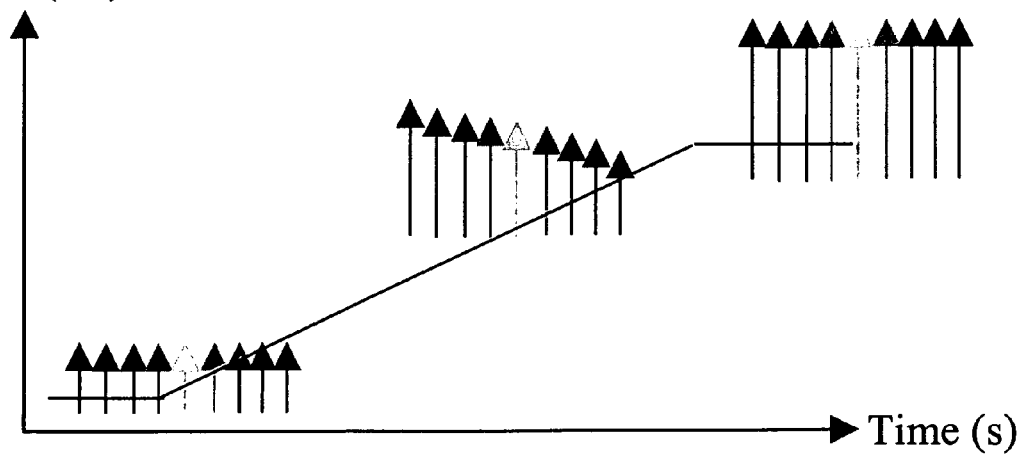
FIG. 4 is a graph corresponding to the graph of FIG. 1 but showing how the gain tilt varies during a set point change in use of such a known arrangement.
Figure 8:
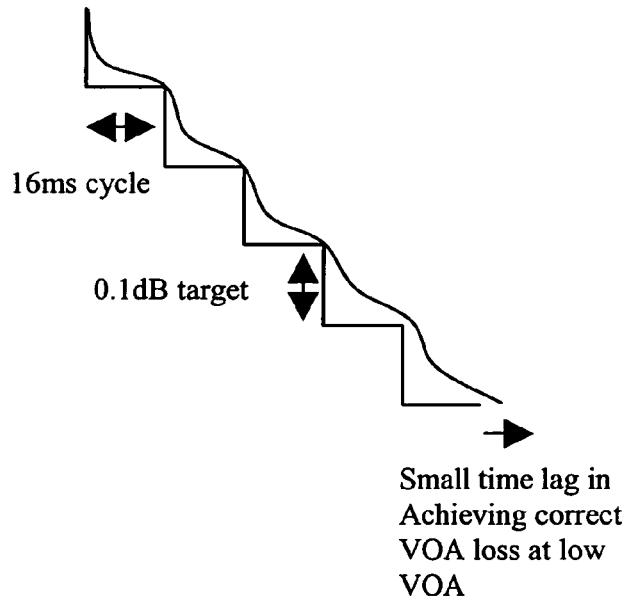
FIG. 8 shows a loss characteristic for a VOA control arrangement utilised in the preferred embodiment of the invention.

One approach for the VOA characteristic shown in FIG. 2 is to use a high gain factor for all VOA settings apart from 0.2 dB from the zero loss point at which unstable operation would otherwise be observed. In this vicinity a lower $K_p$ may be used, resulting in a small lag between the VOA reaching its target value only if the final gain requirement is at minimum gain tilt. FIG. 8 shows the resultant control of the VOA by contrast with the control shown in FIG. 3 for the case where only a single $K_p$ is used. In this case the 16 ms cycle of the VOA step voltage results in the VOA target being met at the majority of VOA losses. As the VOA step voltage increases, the target is only not quite met at the last few VOA steps, resulting in a small time lag in achieving the correct VOA loss at low VOA losses. This provides accurate gain tilt control across the whole gain range, but with a small overshoot if the final gain is at minimum VOA loss.

Figure 5:
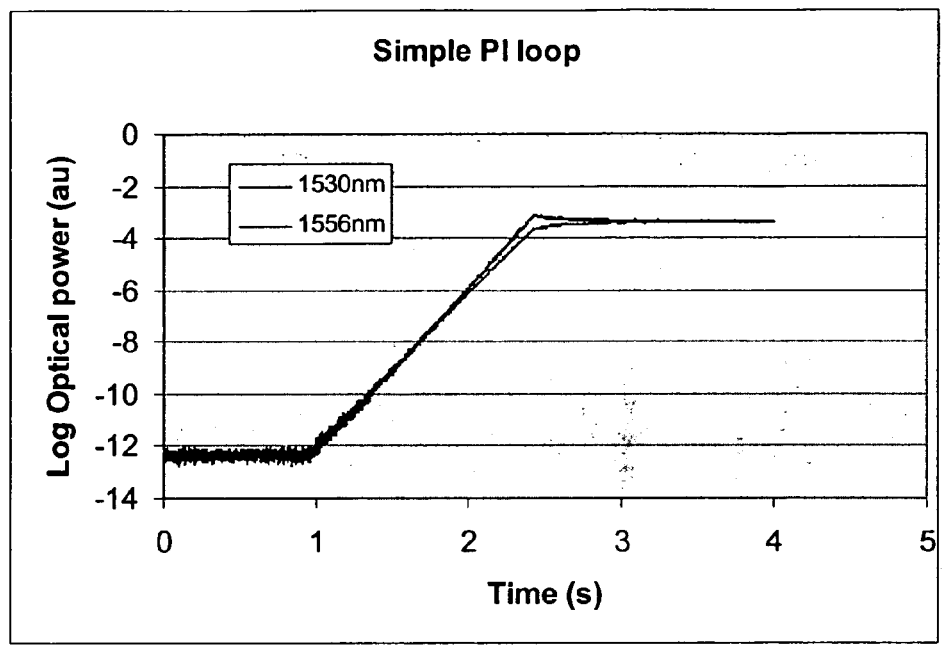
FIG. 5 illustrates variation of the log optical power with time for two channels during a gain set point change from a low gain to a high gain, FIG. 6 showing an enlarged view.
Figure 6:
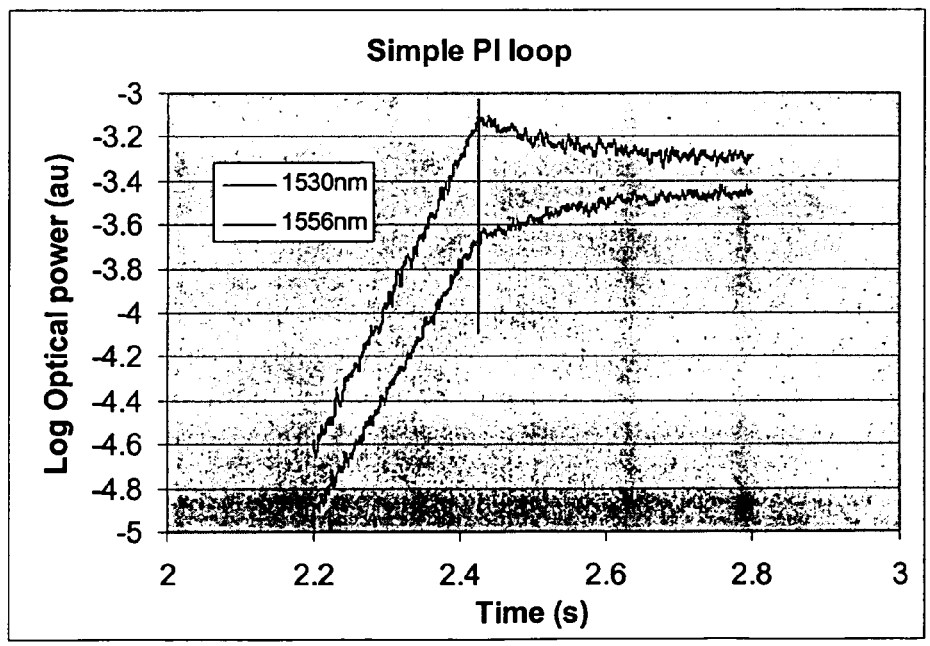
Figure 9:
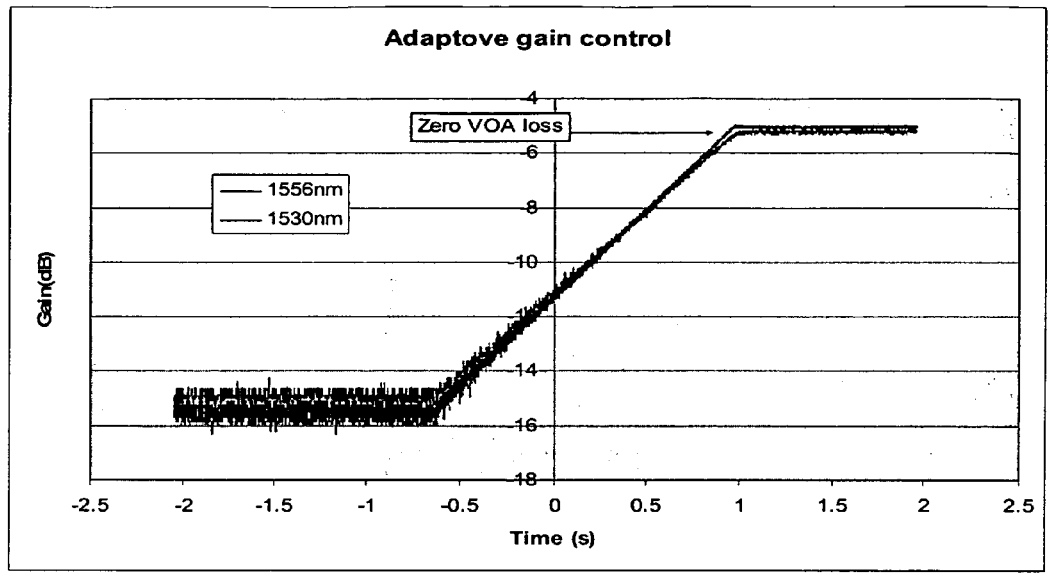
FIGS. 9, 10 and 11 show responses of two channels, corresponding to the responses shown in FIGS. 5, 6 and 7, obtained by use of the preferred embodiment of the invention.
Figure 10:
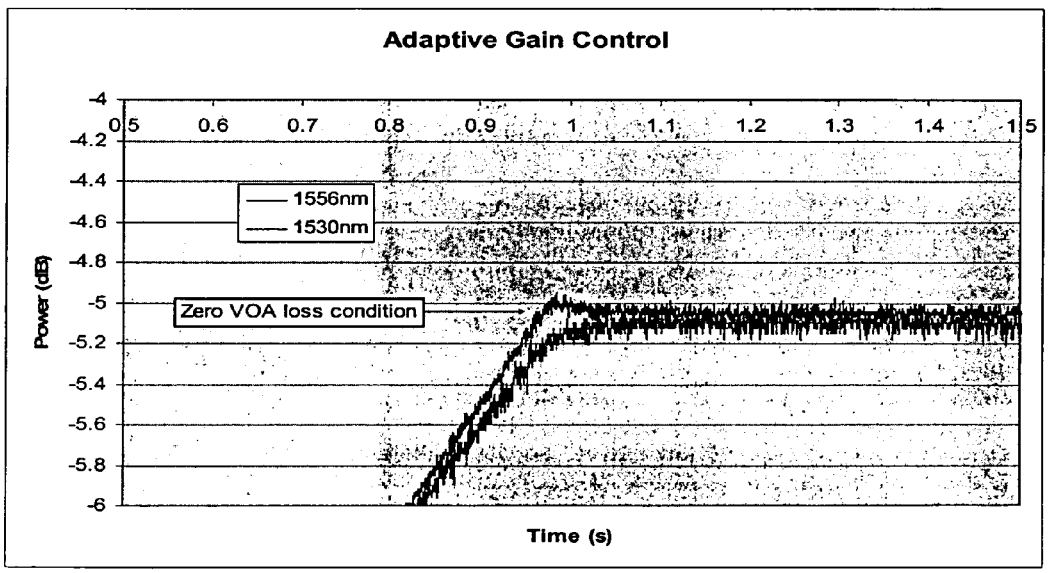

Thus FIG. 9 shows the change in the log optical power with respect to time of the 1530 nm and 1556 nm channels of such an amplifier during a gain set point change from a low gain to a high gain. It will be seen in this figure that, during the rising section of the plot, the ramp is substantially similar for the two channels for substantially the whole of the time, with only a small overshoot of less than 0.1 dB being observed at the zero VOA loss condition due to the small $K_p$ at this point (by comparison with the much larger overshoot shown in FIG. 5). This can be seen more clearly in the enlarged view of FIG. 10 in the vicinity of the zero VOA loss condition.

Figure 7:
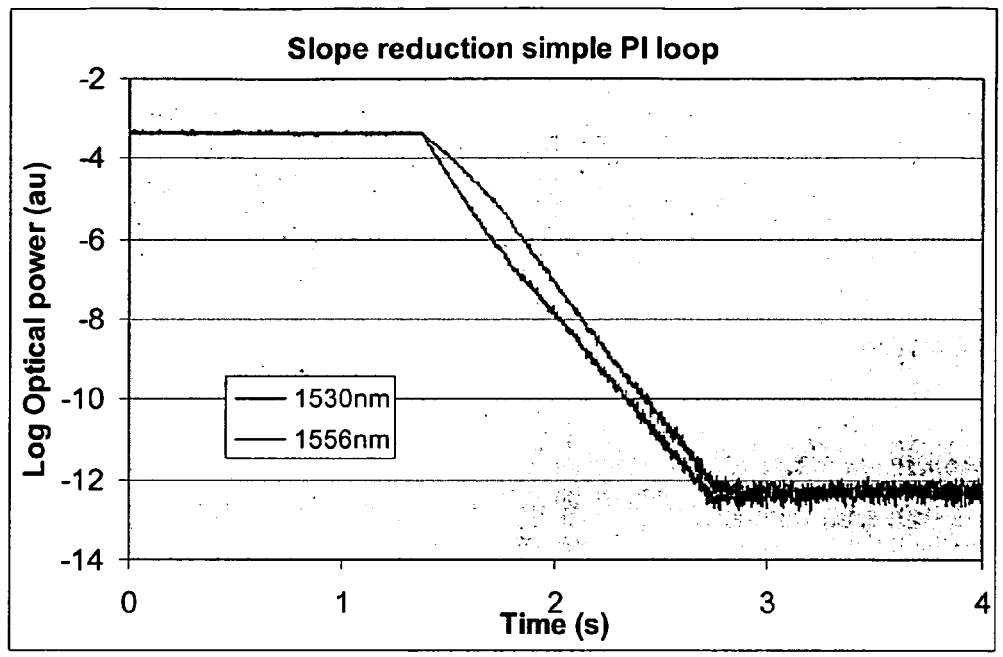
FIG. 7 is a graph showing the change in the log optical power with respect to time during a gain set point change from a high gain to a low gain.
Figure 11:
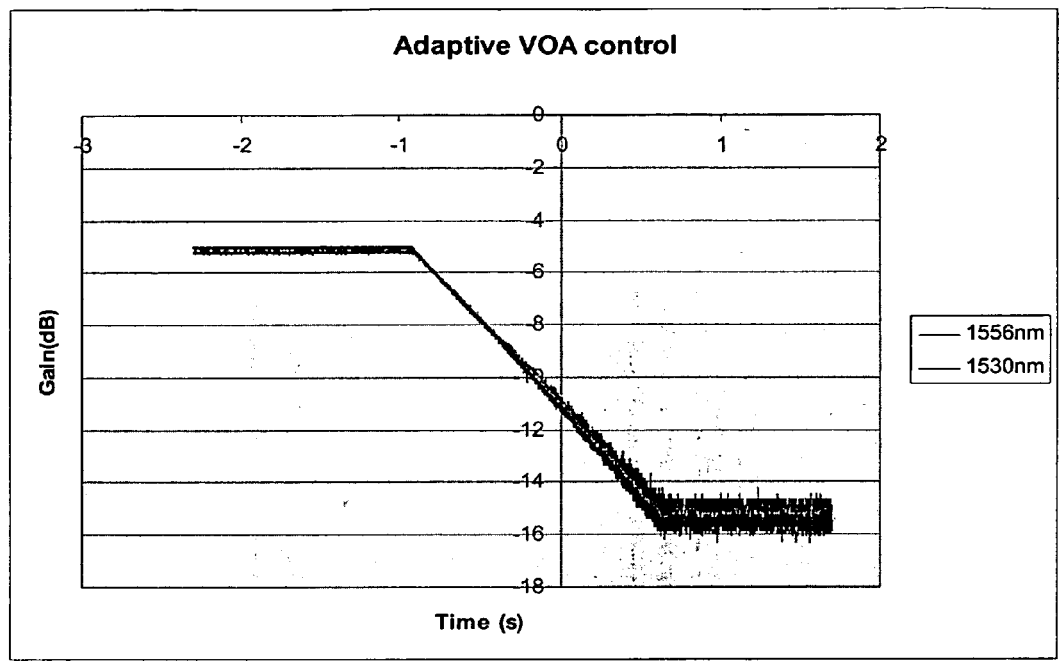

Furthermore FIG. 11 shows the corresponding case for the gain set point change from a high gain to a low gain, with the gain slopes being very linear for both channels over the full gain change range. This provides excellent tilt control as compared with the case shown in FIG. 7 where only a single $K_p$ is used, resulting in dispersion of the channels at high gains.

The control scheme used in the above described embodiment provides substantially constant gain tilt control during a gain set-point change, and thus reduces system degradation during unmanaged provisioning.

Although the preferred embodiment described above makes use of a VOA for control of the gain tilt during a gain set-point change, it should be appreciated that other means of controlling the gain are also contemplated within the scope of the invention, such as a dynamic gain flattening filter (DGFF).

The invention claimed is:

1. An optical amplifier having an adjustable gain set point, comprising:
   (i) amplifying means for amplifying an optical signal comprising channels of different wavelengths,
   (ii) gain control means for controlling the gain of the amplifying means so as to amplify the different channels in accordance with a required gain tilt, and
   (iii) gain tilt adjustment means for applying a gain tilt adaptation profile to the gain control means to compensate for an inherent gain tilt of the amplifying means to produce the required gain tilt, and for changing the gain tilt adaptation profile in response to a change in the gain set point from a first gain setting to a second gain setting to maintain the required gain tilt during the period in which the gain is being changed between the first gain setting and the second gain setting, the gain tilt adjustment means comprising a control loop having at least one control coefficient which is changed as a function of at least one characteristic of the gain control means.

2. An optical amplifier according to claim 1, wherein the gain control means is arranged to control the gain of the amplifying means so as to amplify the different channels in accordance with zero gain tilt corresponding to all the channels being amplified by substantially the same amount.

3. An optical amplifier according to claim 1, wherein the gain control means includes variable attenuation means for varying the level of amplification of the amplifying means.

4. An optical amplifier according to claim 1, wherein the gain control means includes input detection means for detecting an optical input signal to the amplifying means.

5. An optical amplifier according to claim 1, wherein the gain control means includes output detection means for detecting an optical output signal from the amplifying means.

6. An optical amplifier according to claim 1, wherein the control loop of the gain tilt adjustment means incorporates feedback setting means for comparing a current attenuation value related to the gain set point fed back by the gain control means to a required attenuation value and for changing the applied attenuation value in response to a difference between the current attenuation value and the required attenuation value.

7. An optical amplifier according to claim 1, wherein the gain tilt adjustment means incorporates a proportional and integral (PI) controller including the control loop for controlling the gain of the amplifying means at the required gain set point in accordance with a PI coefficient representing the at least one control coefficient and corresponding to the required gain tilt adaptation profile.

8. An optical amplifier according to claim 1, wherein the amplifying means includes at least one erbium-doped fibre loop.

9. An optical amplifier according to claim 1, wherein the amplifying means includes at least one pump laser diode.

10. An optical amplifier according to claim 3, wherein the gain control means is arranged to control the level of attenuation applied by the variable attenuation means in accordance with a required loss profile so as to ensure that the different channels are amplified in accordance with the required gain tilt.

11. An optical amplifier according to claim 3, wherein the at least one characteristic comprises a linearity characteristic of the variable attenuation means in relation to the gain set point.

12. An optical amplifier according to claim 4, wherein the or each detection means incorporates a tap-off coupler for tapping off a proportion of the optical signal.

13. An optical amplifier according to claim 4, wherein the or each detection means incorporates a photodetector for supplying an electrical detection signal indicative of a detected optical signal.

14. An optical amplifier according to claim 5, wherein the or each detection means incorporates a tap-off coupler for tapping off a proportion of the optical signal.

15. An optical amplifier according to claim 5, wherein the or each detection means incorporates a photodetector for supplying an electrical detection signal indicative of a detected optical signal.

16. An optical amplifier according to claim 7, wherein the gain tilt adjustment means incorporates a PI coefficient control means for changing the PI coefficient applied by the PI controller in response to a change in the gain set point to compensate for different gain characteristics of the amplifying means at different gain set points.

17. An optical amplifier according to claim 10, wherein the gain tilt adjustment means is arranged to change the gain tilt adaptation profile in response to a change in the gain set point by changing the loss profile applied by the variable attenuation means.

18. An optical amplifier according to claim 12, wherein the or each detection means incorporates a photodetector for supplying an electrical detection signal indicative of a detected optical signal.

19. An optical amplifier according to claim 14, wherein the or each detection means incorporates a photodetector for supplying an electrical detection signal indicative of a detected optical signal.

20. An optical amplifier according to claim 16, wherein the PI coefficient control means incorporates threshold means for comparing a current attenuation value related to the gain set point to a predetermined threshold value and for selecting the appropriate PI coefficient in dependence on the result of this comparison.

* * * * *